(12) United States Patent
Fagundes

(10) Patent No.: US 8,774,393 B2
(45) Date of Patent: Jul. 8, 2014

(54) MANAGING A CONTACT CENTER BASED ON THE DEVICES AVAILABLE FOR USE BY AN AGENT

(75) Inventor: Luciano Godoy Fagundes, Sao Paulo (BR)

(73) Assignee: Avaya Inc., Basking Ridge, NJ (US)

( * ) Notice: Subject to any disclaimer, the term of this patent is extended or adjusted under 35 U.S.C. 154(b) by 50 days.

(21) Appl. No.: 13/398,093

(22) Filed: Feb. 16, 2012

(65) Prior Publication Data

US 2013/0216038 A1 Aug. 22, 2013

(51) Int. Cl.
*H04M 3/00* (2006.01)
*H04M 5/00* (2006.01)

(52) U.S. Cl.
USPC ............................. 379/265.13; 379/201.01

(58) Field of Classification Search
USPC ....................................... 379/265.13, 201.01
See application file for complete search history.

(56) References Cited

U.S. PATENT DOCUMENTS 6,704,409 B1 * 3/2004 Dilip et al. ............... 379/265.02
2009/0327871 A1 12/2009 Wolf et al.

OTHER PUBLICATIONS

Nortel Networks, "Nortel Communication Server 1000: CS 1000 to MCS 5100 Converged Desktop Type 2 Configuration Guide," Document No. 553-3001-521, Document Release 3.00, Oct. 2006, 132 pages, produced in Canada.
Nortel Networks, "Converged Multimedia User Guide," MCS09FF Standard (06.01), Part No. NN10426-112, Aug. 2006, 116 pages, believed to have been produced in Canada.
Nortel Networks, "Nortel Adaptive Application Engine: Converged Desktop User Guide," Product Release 7.0 Service Package 1, Document No. NN48111-115, Document Version 01.01, Jul. 24, 2009, 98 pages, believed to have been produced in Canada.

* cited by examiner

*Primary Examiner* — Quynh Nguyen

(57) ABSTRACT

In a contact center, agents are assigned to support customers using various media, such as audio, video, and/or text communications. The various media types have a related application. The mediums that an agent can support are determined. In addition, an agent has devices that are available for use by the agent. For example, the agent may have a cellular telephone and a tablet device available for use. The related application(s) are associated with the devices available for use by the agent based on a capability of at least one device. This is done in relation to the medium(s) supported by the agent. For example, an audio application can be associated with a cellular telephone and a text application can be associated with a tablet device. As the devices or mediums supported by the agent changes, the system can re-associate the related application(s) based on the new configuration.

19 Claims, 5 Drawing Sheets

MANAGING A CONTACT CENTER BASED ON THE DEVICES AVAILABLE FOR USE BY AN AGENT

TECHNICAL FIELD

The system and method relates to contact centers, and in particular to managing contact centers.

BACKGROUND

The traditional model for contact centers is to have agents report to the contact center for specific shifts. The contact centers are set up to support a particular medium such as audio communications. In addition, the devices available to the agent in the contact center are fixed and usually uniform between agents. For example, an agent supporting voice communications typically has a phone for handling calls and a personal computer to retrieve information about the customer.

As contact center technology has advanced, many changes have taken place. Today, a contact center may support a variety of mediums, such as voice, video, and text communications. In some contact centers, an agent may support a single medium or several mediums simultaneously. For example, the agent may support both audio and email communications from customers. The mediums supported by an agent may dynamically change based on needs in the contact center. In addition, many contact centers have moved to a model of having some, if not all, of the agents being remote to the contact center. In many instances, the agent may be using their own devices when supporting communications with customers. The result is that it has become difficult to provide uniform communication services for agents. What is needed is a way to dynamically determine the mediums that can be supported by the agent and the types of devices available for use by the agent in order to provide the best environment for the agent to support the customer.

SUMMARY

The system and method are directed to solving these and other problems and disadvantages of the prior art. In a contact center, agents are assigned to support customers using various media, such as audio, video, and/or text communications. The various media types have a related application. The mediums that an agent can support are determined. In addition, an agent has devices that are available for use by the agent. For example, the agent may have a cellular telephone and a tablet device available for use. The related application(s) are associated with the devices available for use by the agent based on a capability of at least one device. This is done in relation to the medium(s) supported by the agent. For example, an audio application can be associated with a cellular telephone and a text application can be associated with a tablet device. As the devices or mediums supported by the agent change, the system can re-associate the application(s) based on the new configuration.

In other embodiments, multiple mediums can be associated with multiple devices or multiple mediums can be associated with a single device. A single medium can also be associated with multiple devices.

In addition, other factors can be used to determine which devices are associated with a related application. For example, the location of the agent can be used to determine which mediums an agent supports. The types of devices, screen sizes, ability to receive audio calls, the ability to support a handset, and/or the ability to support a speaker phone can be used to determine which mediums an agent supports. This can also be configured via an administrator.

The system and method further include the ability for a software application installed on the device to determine additional devices attached to the device and other configuration information, such as the agent logging into an email client. This makes the associated application aware that the agent is ready to support a medium.

BRIEF DESCRIPTION OF THE DRAWINGS

In order to describe the manner in which other advantages and features of the disclosure can be obtained, a more particular description of the principles briefly described below will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

In the appended Figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The following description and associated Figures teach various modes of the invention. The following claims specify the scope of the invention. Note that some aspects of the various modes may not fall within the scope of the invention as specified by the claims. Those skilled in the art will appreciate that the features described below can be combined in various ways to form multiple variations of the invention. As a result, the invention is not limited to the specific examples described below, but only by the claims and their equivalents.

Figure 1:
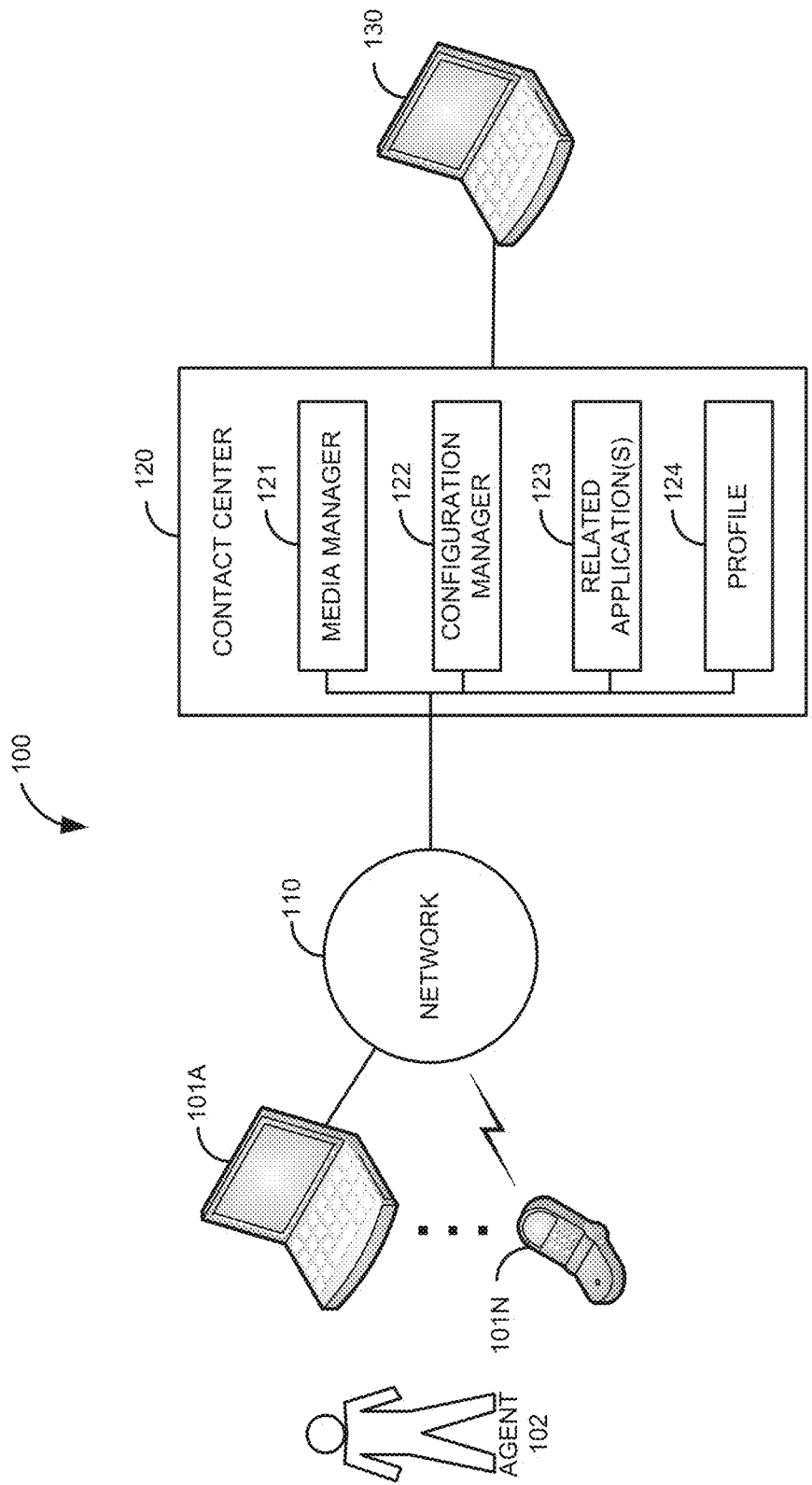
FIG. 1 is a block diagram of a first illustrative system for managing a contact center based on the devices available for use by an agent.

FIG. 1 is a block diagram of a first illustrative system 100 for managing a contact center 120 based on devices 101A-101N available for use by agent 102. The first illustrative system 100 comprises devices 101A-101N, network 110, contact center 120, and administration terminal 130. For illustrative purposes, agent 102 is also shown. Devices 101A-101N can be any device that can be used by agent 102, such as a Personal Computer (PC), a laptop computer, a telephone, a cellular telephone, a tablet device, a smart phone, a keyboard, a mouse, a trackball, a video camera, and the like. Administration terminal 130 can be any device used for administering contact center 120, such as a Personal Computer (PC), a laptop computer, a tablet device, a smart phone, and the like.

Network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. Network 110 can use a variety of protocols, such as Ethernet, Internet Protocol (IP), Session Initiation Protocol (SIP), Integrated Services Digital Network (ISDN), circuit switched protocols, and the like.

Contact center 120 further comprises media manager 121, configuration manager 122, related application(s) 123, and profile 124. Media manager 121 can be any hardware/software that can manage various types of media, such as a Private Branch Exchange (PBX), a mail server, a video server, a video switch, a telephony switch, an Instant Message (IM) server, a combination of these, and the like. Media manager 121 can manage one or more media types, such as audio communications, video communications, email communications, Instant Message (IM) communications, text communications, and the like.

Configuration manager 122 can be any hardware/software that can detect the configuration of devices 101A-101N. Profile 124 can be any storage medium that can hold information, such as a file, a directory service, a relational database, an object oriented database, and the like. The information in profile 124 can be stored in a memory or disk. Profile 124 can contain configuration information about devices 101A-101N, information about agent 102, administered information, configuration information for contact center 120, information about customers, and the like.

Media manager 121 determines a medium that agent 102 supports in contact center 120. A medium can be voice calls, video calls, Instant Messages (IM), emails, text messages, and the like. The medium has a related application 123. For example, a call routing application can be used to support voice calls, a video router can be used to support video calls, an Instant Message (IM) application can be used to support Instant Messages (IM), and an email application can be used to support emails. Agent 102 may support more than one medium at the same. For instance, agent 102 can support voice calls and Instant Message (IM) communications. Which mediums agent 102 supports is typically administered by an administrator; the administrator configures which mediums agent 102 supports via administration terminal 130. However, the mediums that agent 102 supports can change dynamically based on other factors such as contact center 120 loading. Alternatively, the mediums that agent 102 supports can change based on the types of devices 101A-101N that are available for use by an agent 102. For example, if the agent's cell phone (101) is out of power and no longer available for use by agent 102, media manager 121 can un-associate the audio medium application (123) from the cell phone (101). The audio medium may then be associated with another device 101 if the other device 101 can support audio communications. Alternatively, the audio medium may no longer be supported by agent 102 until the cell phone has been recharged and is available for use by agent 102. At this point, the audio medium application may be re-associated with the cell phone (101).

Configuration manager 122 detects a plurality of devices 101A-101N available for use by agent 102. Configuration manager 122 can detect the plurality of devices 101A-101N available for use by agent 102 in different ways. For example, configuration manager 122 can detect that agent 102 has a personal computer (101) available for use by detecting that agent 102 has logged into contact center 120 via a Virtual Private Network (VPN). Configuration manager 122 can detect that agent 102 has a mobile telephone (101) available for use by having the contact administrator defining the device 101 and its attributes in profile 124. Still other ways that configuration manager 122 can detect that devices 101A-101N are available for use by agent 102 can include having one or more of devices 101A-101N notify configuration manager 122 when the one or more devices 101 power up, by configuration manager 122 sending a message to device 101 to determine if device 101 is active, by placing a call via an Integrated Voice Response (IVR) system (not shown) to agent 102, and the like.

Media manager 121 associates the related application 123 with at least one of the plurality of devices 101A-101N. How media manager 121 associates the related application 123 with a device 101 can be accomplished in various ways. For instance, media manager 121 can associate a text application (123) with device 101 that has the largest screen size. If the application is an audio application (123), media manager 121 can associate the audio application (123) based on the device 101 being able to receive audio calls, based on being able to support a headset, having a speaker phone, and/or the like.

Media manager 121 can associate multiple related applications 123 with a specific device 101. For example, media manager 121 could associate an Instant Message (IM) application (123) and an audio application (123) with a Personal Computer (PC) (101) that can support Instant Messaging (IM) and voice communications.

Alternatively, media manager 121 can associate multiple related applications 123 with multiple devices 101. For instance, media manager 121 can associate video application (123) with a Personal Computer (PC) or tablet device and an audio application (123) with a telephone. In addition, media manager 121 can associate multiple related applications 123 with a specific device 101 at the same time.

Media manager 121 can associate a single media with multiple devices 101A-101N. For example, if agent 102 has two devices 101 that could support audio calls, media manager 121 could associate the audio media application (123) with both devices 101. If a voice call is received, the call can be routed to both devices 101, thus giving agent 102 the opportunity to select which device 101 to use for an incoming call.

How media manager 121 associates related applications 123 can be accomplished in a variety of ways. For example, the administrator can define how the related applications 123 are associated in profile 124. The association can be accomplished automatically based on an algorithm that looks at the features of each device 101 and determines the best device 101 to support a particular medium. For instance, the algorithm can select the device 101 that supports the largest screen size for text applications and the device 101 that has an email client to support emails.

Figure 2:
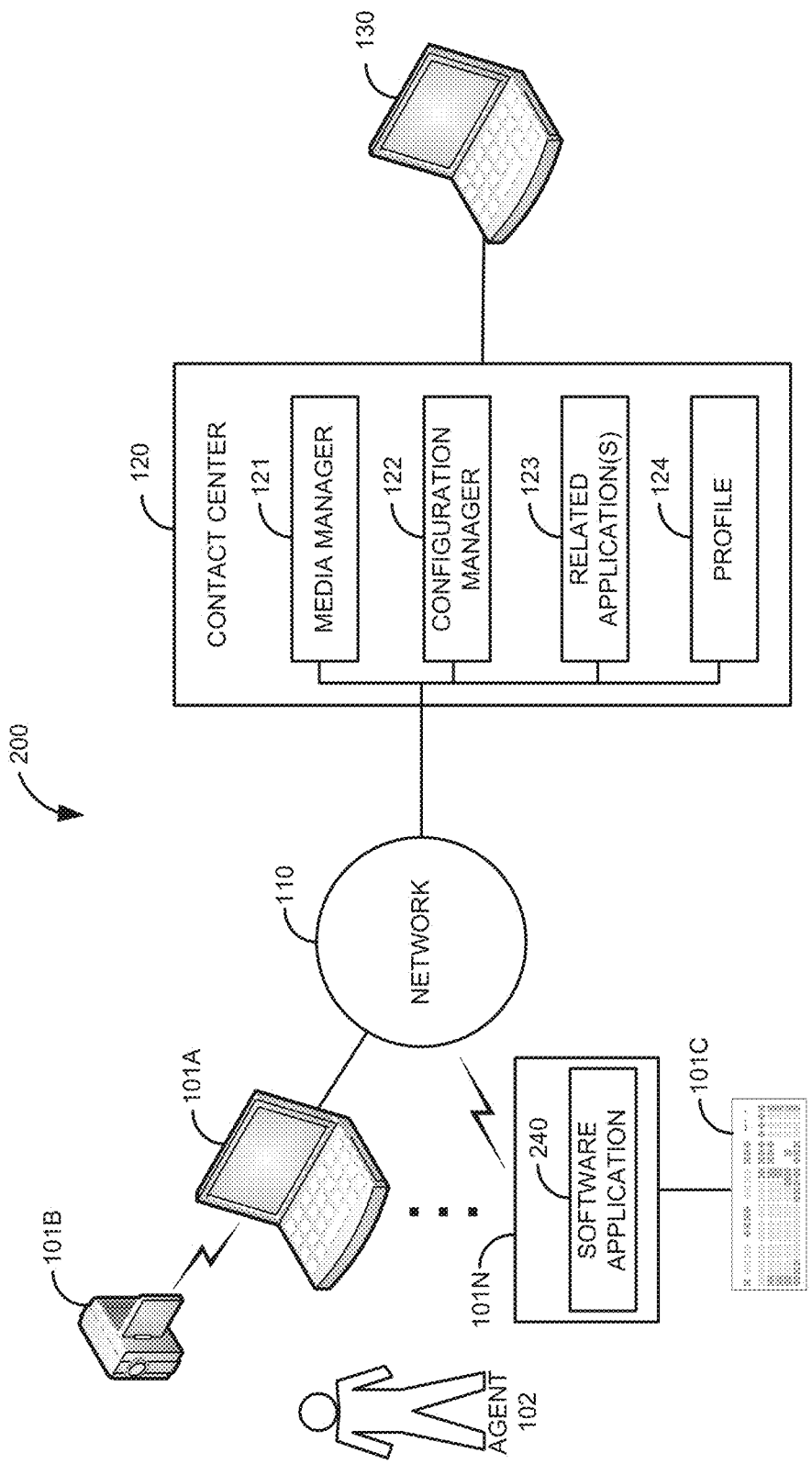
FIG. 2 is a block diagram of a second illustrative system for managing a contact center based on the devices available for use by an agent.

FIG. 2 is a block diagram of a second illustrative system 200 for managing contact center 120 based on devices 101A-101N that are available for use by agent 102. The second illustrative system 200 comprises devices 101A-101N, network 110, contact center 120, and administration terminal 130. The second illustrative system 200 is shown further comprising devices 101B and 101C. In this example, device 101B is a video camera that wirelessly connects to device (personal computer) 101A. The second illustrative system 200 also comprises device (keyboard) 101C that connects to device 101N. Devices 101B-101C could be different devices, such as a mouse, a track ball, a monitor, and the like.

Media manager 121 determines a medium that agent 102 supports in contact center 120. Configuration manager 122 detects a plurality of devices 101A-101N available for use by agent 102. In this illustrative example, configuration manager 122 detects devices 101A, 101B (connected to device 101A), device 101N, and device 101C (connected to device 101N). When device 101B (video camera) connects to device 101A (personal computer), the combination of the two devices 101A-101B can provide different functionality than device 101A by itself. For example, the combination of devices 101A and 101B can now support video communications where previously device 101A could not. Likewise, the combination of devices 101N and 101C can provide different functionality than device 101N by itself. By attaching device 101C (keyboard), agent 102 may now be more easily able to respond to text media.

Based on the different types of devices 101A-101N, media manager 121 may associate different related applications 123 with devices 101A-101N. For example, if agent 102 only had devices 101A and 101N available, media manager 121 may associate text media application (123) with device 101A and voice media application (123) with device 101N. When configuration manager 122 detects the addition of devices 101B and 101C, media manager 121 may assign related application(s) 123 differently. For instance, upon configuration manager 122 detecting devices 101 B and 101C (122), media manager 121 may un-assign the text media application (123) from device 101A and now associate the combination of devices 101A-101B to a video media application 123. Likewise, media manager 121 may reassign the text media application (123) to the combination of devices 101N and 101C (in addition to the audio media application (123) that was assigned previously).

In this illustrative example, device 101N also comprises software application 240. Software application 240 can be any software application that can communicate with related application 123, such as a web browser, an email client, an Instant Message (IM) client, a video application, a voice application, and/or the like. For instance, software application 240 could be an email client or Instant Message (IM) client that is used by agent 102 to communicate with customers via email or Instant Message (IM) by communicating with a related email or Instant Message (IM) server (123). Software application 240 could be a video application that could be used to establish video communications to a related video application (123).

In addition, software application 240 can communicate other information to media manager 121. For example, software application 240 could be an email client. When agent 102 brings up the email client (240), the email client (240) could communicate to media manager 121 that agent 102 is ready to start supporting email media.

Software application 240 can be used by configuration manager 122 to detect the plurality of devices 101A-101N available to agent 102. For example, software application 240 could detect that agent 102 plugged in keyboard (101C) into device 101N and report that information to configuration manager 122. Likewise, if software application 240 was installed in communication device 101A, software application 240 could detect that video camera 101B was attached to communication device 101A and report this information to configuration manager 122.

Figure 3:
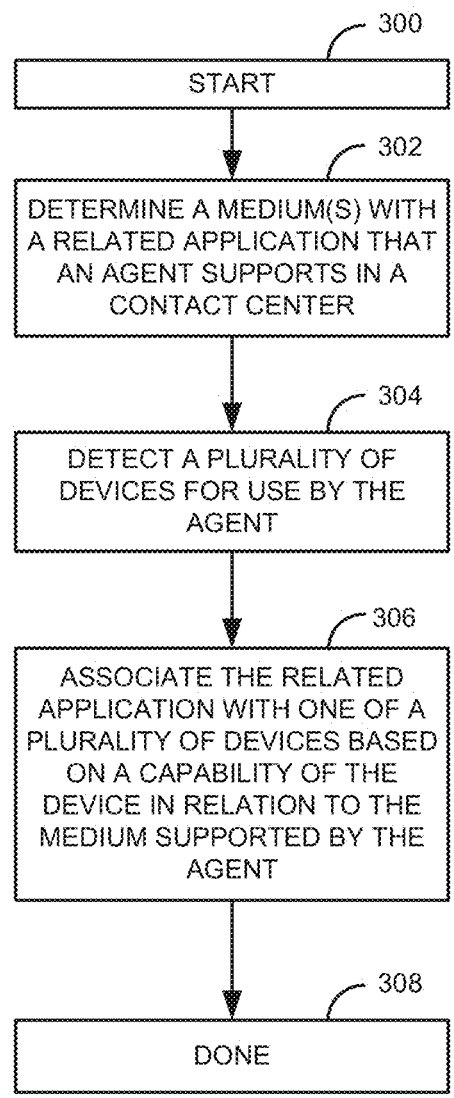
FIG. 3 is a flow diagram of a method for managing a contact center based on the devices available for use by an agent.

FIG. 3 is a flow diagram of a method for managing contact center 120 based on devices 101A-101N being available for use by agent 102. Illustratively, devices 101A-101N, contact center 120, media manager 121, configuration manager 122, related application(s) 123, and software application 240 are stored-program-controlled entities, such as a computer or processor, which performs the method of FIGS. 3-5 and the processes described herein by executing program instructions stored in a tangible computer readable storage medium, such as a memory or disk.

The process starts in step 300. Media manager 121 determines 302 a medium that agent 102 supports in contact center 120. The medium has a related application 123. Configuration manager 122 detects 304 a plurality of devices 101A-101N available for use by agent 102. Media manager 121 associates 306 the related application 123 with at least one of the plurality of devices 101A-101N based on the capability of the devices 101A-101N in relation to the medium supported by agent 102. The process is then done in step 308.

Figure 4:
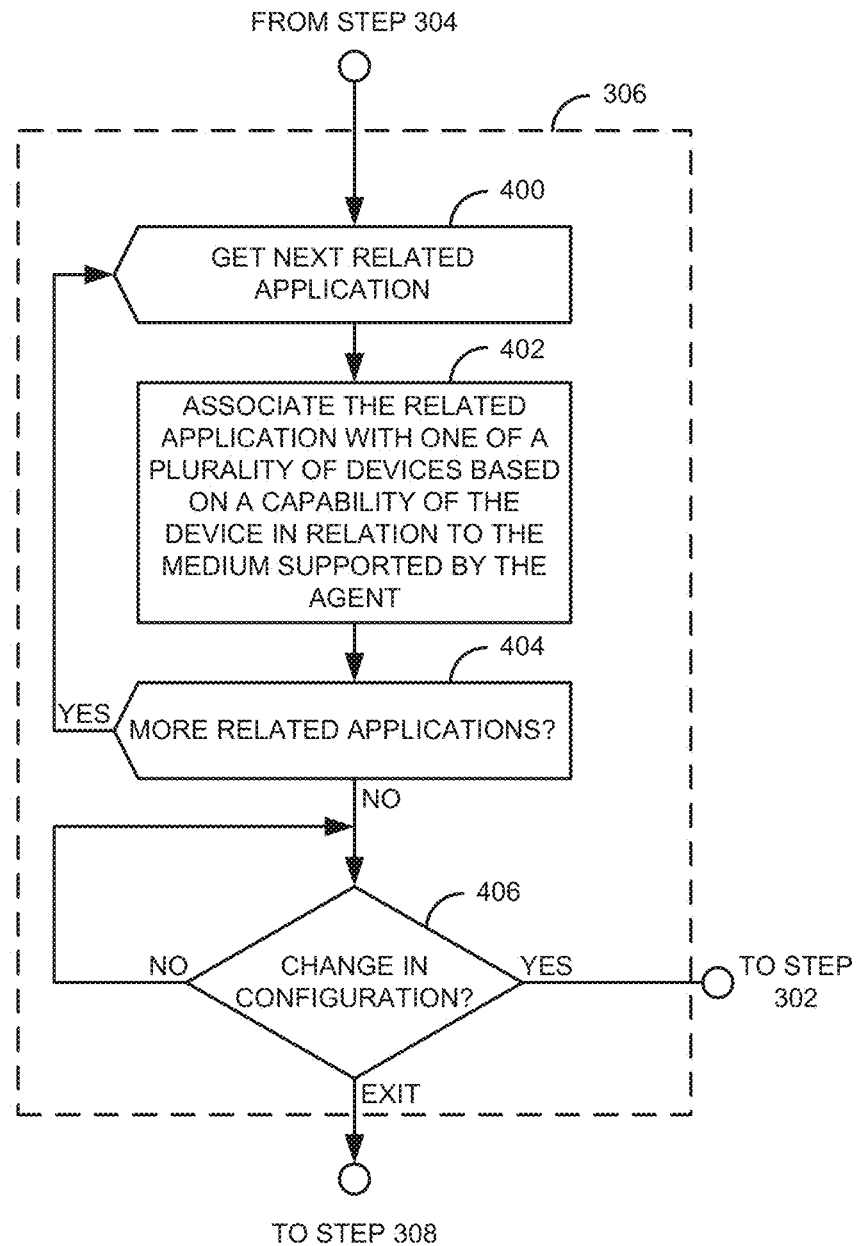
FIG. 4 is a flow diagram of a method for associating a related application with a device.

FIG. 4 is a flow diagram of a method for associating related application 123 with device 101. The process described in FIG. 4 is an exemplary way of implementing step 306 in FIG. 3. After detecting devices 101A-101N, for use by agent 102 in step 304, media manager 121 gets 400 the next related application 123. Media manager 121 associates 402 the related application 123 with one of the devices 101 based on a capability of the device 101 in relation to the supported medium. Media manager 121 determines in step 404 if there are more related applications 123, if so the process goes to step 400.

Otherwise, if there are no more related applications in step 404, configuration manager 122 determines if there has been a change in configuration in step 406. A change in configuration can include a change in the number of devices 101A-101N available to agent 102, a change in location of agent 102, agent 102 being assigned to support a new medium, or some other change that may initiate a modification of which devices 101A-101N are associated with related application 123. If there has been a change in the configuration in step 406, the process goes to step 302. This way, the process keeps running to allow plug-and-play capability when an agent gains access to a new device 101. If there has not been a change in step 406, the process repeats step 406. If the administrator wants to exit in step 406, the process goes to step 308 and is done.

Figure 5:
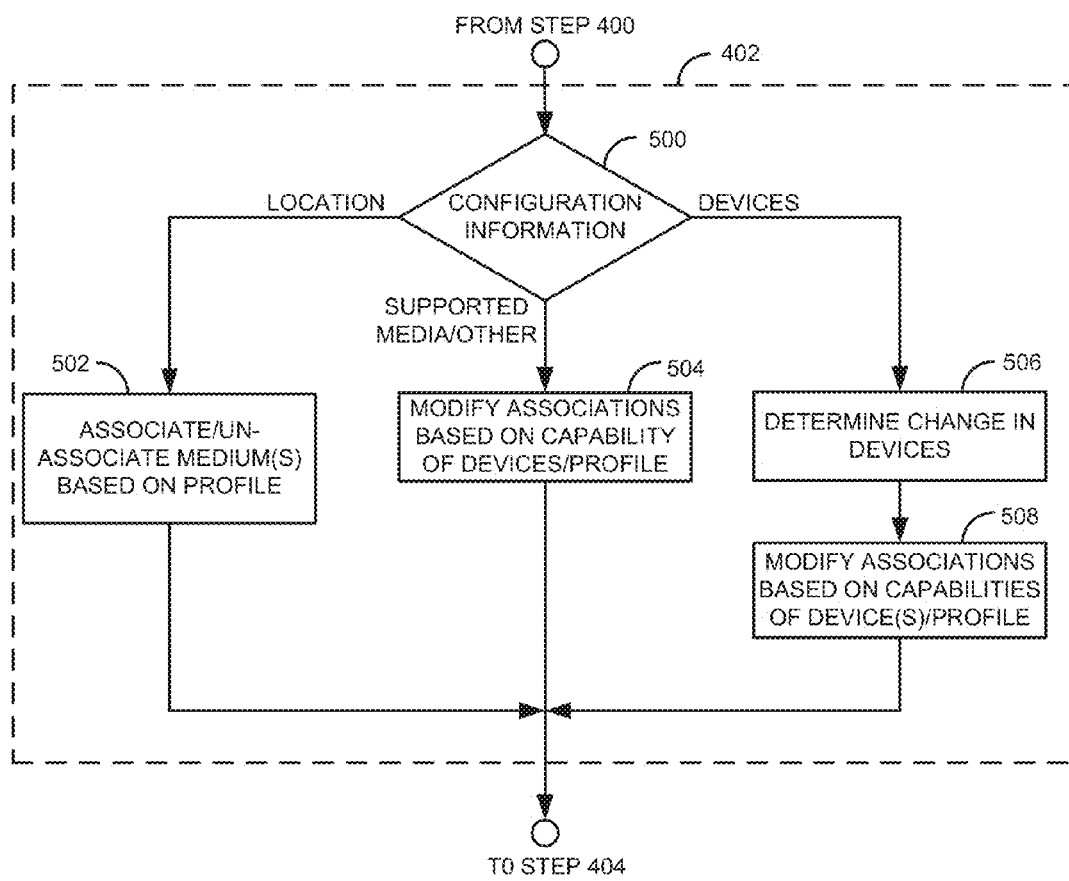
FIG. 5 is a flow diagram of a method for associating or un-associating a related application with a device.

FIG. 5 is a flow diagram of a method for associating or un-associating related application 123 with device 101A-101N. After getting the next related application 123 in step 400, the process determines in step 500 the configuration information. Configuration information is typically located in profile 124. Configuration information can be the number of devices 101A-101N, the location of agent 102, a media type to be supported by agent 102, and/or other types of information.

If the location of agent 102 has changed in step 500, media manager 121 can associate or un-associate 502 a related application (123) from device 101. For example, if it has been determined that agent 102 is in a public location without a headset (i.e., determined via Global Positioning Satellite (GPS)), the audio medium application (123) may be un-associated 502 from a device 101 that previously was associated with audio medium application 123. Likewise, if it has been determined that agent 102 has moved to a non-public location (e.g., in the location of contact center 120), audio medium application 123 can be associated 502 with one of devices 101A-101N. How related applications 123 are associated and un-associated may be based on configuration information in profile 124. After completing step 502, the process goes to step 404.

If the configuration information for the media that agent 102 supports in contact center 120 has changed (or if this is the first time through the process of FIGS. 3-5), media manager 121 modifies 504 the associations based on the capability of devices 101A-101N. For example, if the administrator added video as a media to be supported by agent 102, media manager 121 (based on camera 101B being attached to computer 101A) associates video media application 123 with devices 101A-101B. Likewise, if other information has changed, media manager 121 can modify the associations in step 504 based on other information in profile 124. After completing step 504, the process goes to step 404.

If a change in devices 101A-101N has occurred, configuration manager 122 determines 506 the changes in devices 101A-101N. Media manager 121 modifies 508 the associations based on the capability of devices 101A-101N. The associations can also be modified based on configuration information in profile 124. For example, if configuration manager 122 determined in step 506 that camera 101B no longer is connected to device 101A and that there is currently a video media application 123 associated with the combination of devices 101A-101B, media manager 121 can modify the association by un-associating video media application 123 from device 101A (also from 101B because it is no longer available for use by agent 102). After completing step 508, the process goes to step 404.

Each of the decisions made in step 500 may occur in parallel in relation to an individual related application 123. For example, if the number of devices 101A-101N changed and a supported media also changed at the same time, steps 504 can be executed in parallel with steps 506 and 508. In addition, if multiple changes have occurred, various combinations of steps (502, 504, 506, and 508) can be implemented to provide the best environment for agent 102.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated Figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   determining, in a media manager, a medium that an agent supports in a contact center, wherein the medium has a related application;
   detecting, in a configuration manager, a plurality of devices available for use by the agent, with the configuration manager actively communicating with the agent to detect each device available to the agent at that time, wherein the detecting gives the agent and the configuration manager a plug-and-play capability for a new device when the new device becomes available to the agent; and
   associating, in the media manager, the related application with at least one of the plurality of devices based on a capability of the at least one of the plurality of devices in relation to the medium supported by the agent.

2. The method of claim 1, wherein the medium is a plurality of mediums that the agent supports and each of the plurality of mediums has a related application, and wherein the associating step comprises associating at least two of the related applications with at least two of the plurality of devices.

3. The method of claim 2, wherein the at least two of the related applications are for an audio medium and a text medium and further comprising the steps of:
   determining, in the configuration manager, if a location of the agent is public; and
   responsive to determining that the location of the agent is public, un-associating, in the media manager, the application for the audio medium from the associated device.

4. The method of claim 2, wherein the at least two applications are an audio application and a video application and the plurality of devices are a telephone, and a personal computer or a tablet device, and wherein the audio application is associated with the telephone and the video application is associated with the personal computer or the tablet device.

5. The method of claim 1, wherein the medium is a video medium or a text medium and the related application is associated with the at least one of the plurality of devices based on the one of the plurality of devices having a capability of a larger screen size.

6. The method of claim 1, wherein the medium is an audio medium and the related application is associated with the at least one of the plurality of devices based on the at least one of the plurality of devices supporting at least one of the following capabilities: the ability to receive audio calls, the ability to support a headset, and the ability to support a speaker phone.

7. The method of claim 1, further comprising the steps of:
   determining a second medium with a second related application that the agent supports in the contact center;
   associating the second related application to the at least one of the plurality of devices; and
   re-associating the related application with a second one of the plurality of devices.

8. The method of claim 1, further comprising the at least one of the plurality of devices, wherein the at least one of the plurality of devices comprises a software application that communicates with the associated application.

9. The method of claim 1, wherein determining the medium that the agent supports in the contact center is based on at least one of detecting the plurality of devices available for use by the agent and an administered configuration.

10. A system comprising:
    a configuration manager configured to detect a plurality of devices available for use by an agent, with the configuration manager actively communicating with the agent to detect each device available to the agent at that time, wherein the detecting gives the agent and the configuration manager a plug-and-play capability for a new device when the new device becomes available to the agent; and
    a media manager configured to determine a medium that the agent supports in a contact center, wherein the medium has a related application, and associate the related application with at least one of the plurality of devices based on a capability of the at least one of the plurality of devices in relation to the medium supported by the agent.

11. The system of claim 10, wherein the medium is a plurality of mediums that the agent supports and each of the plurality of mediums has a related application, and wherein the media manager is further configured to associate at least two of the related applications with at least two of the plurality of devices.

12. The system of claim 11, wherein the at least two of the related applications are for an audio medium and a text medium and wherein:
the configuration manager is further configured to determine if a location of the agent is public; and
responsive to determining that the location of the agent is public, the media manager is further configured to un-associate the application for the audio medium from the associated device.

13. The system of claim 11, wherein the at least two applications are an audio application and a video application and the plurality of devices are a telephone and a personal computer or a tablet device, and wherein the audio application is associated with the telephone and the video application is associated with the personal computer or the tablet device.

14. The system of claim 10, wherein the medium is a video medium or a text medium and the related application is associated with the at least one of the plurality of devices based on the one of the plurality of devices having a capability of a larger screen size.

15. The system of claim 10, wherein the medium is an audio medium and the related application is associated with the at least one of the plurality of devices based on the at least one of the plurality of devices supporting at least one of the following capabilities: the ability to receive audio calls, the ability to support a headset, and the ability to support a speaker phone.

16. The system of claim 10, wherein the media manager is further configured to determine a second medium with a second related application that the agent supports in the contact center, associate the second related application to the at least one of the plurality of devices, and re-associate the related application with a second one of the plurality of devices.

17. The system of claim 10, further comprising the at least one of the plurality of devices, wherein the at least one of the plurality of devices comprises a software application that communicates with the associated application.

18. The system of claim 10, wherein determining the medium that the agent supports in the contact center is based on at least one of detecting the plurality of devices available for use by the agent and an administered configuration.

19. A non-transitory tangible computer readable medium having stored thereon instructions that cause a processor to execute a method, the method comprising:
instructions to determine a medium that an agent supports in a contact center, wherein the medium has a related application;
instructions to detect a plurality of devices available for use by the agent, with the configuration manager actively communicating with the agent to detect each device available to the agent at that time, wherein the detecting gives the agent and the configuration manager a plug-and-play capability for a new device when the new device becomes available to the agent; and
instructions to associate the related application with at least one of the plurality of devices based on a capability of the at least one of the plurality of devices in relation to the medium supported by the agent.

* * * * *